No. 656,215. Patented Aug. 21, 1900.
A. RAWLINSON.
MOTOR CAR DRIVING GEAR AND GEAR CHANGING DEVICE.
(Application filed Jan. 9, 1900.)
(No Model.) 3 Sheets—Sheet 1.
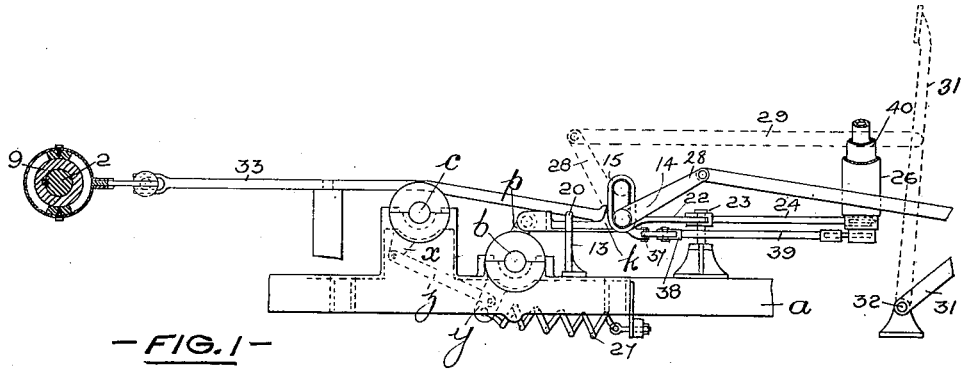
—FIG.1—
WITNESSES:
Ella L. Giles
O. Dunn
INVENTOR
Alfred Rawlinson
BY Richards & Co
ATTORNEYS

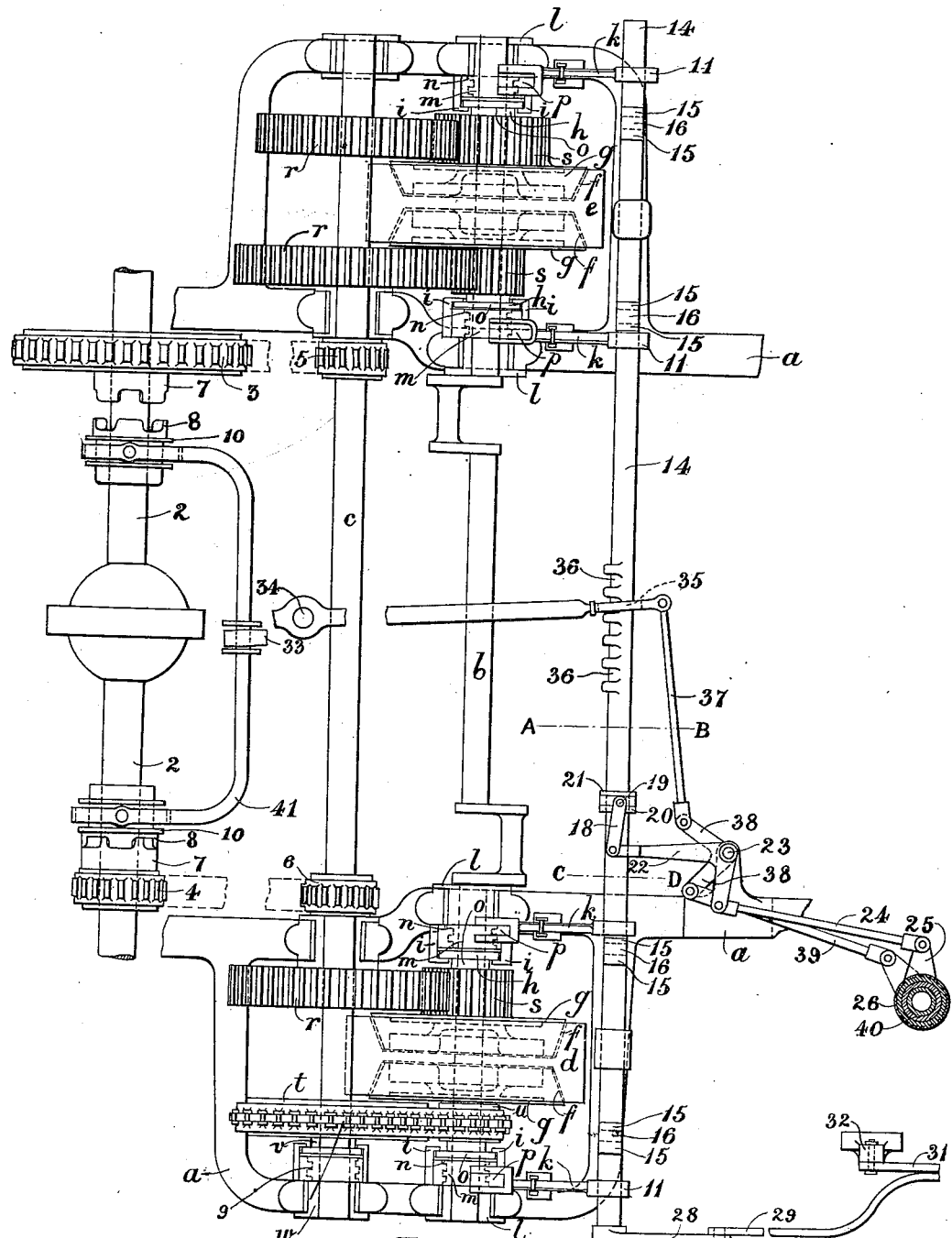

No. 656,215. Patented Aug. 21, 1900.
A. RAWLINSON.
MOTOR CAR DRIVING GEAR AND GEAR CHANGING DEVICE.
(Application filed Jan. 9, 1900.)
(No Model.) 3 Sheets—Sheet 3.
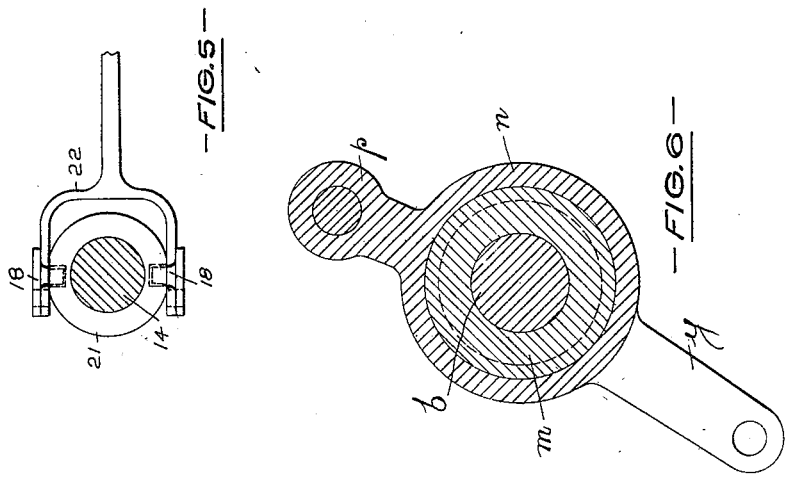
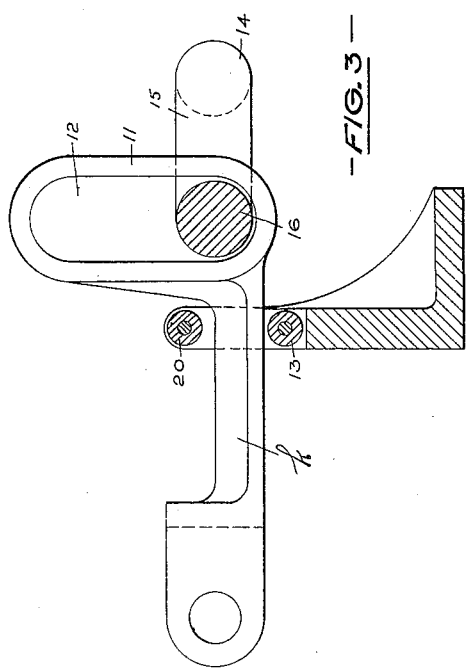
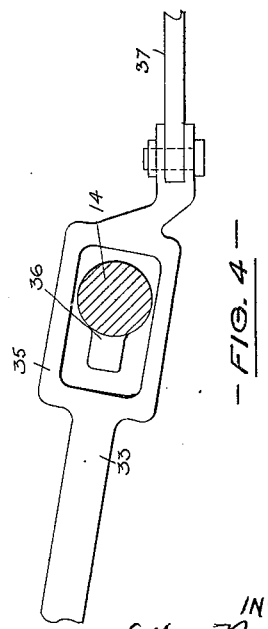
WITNESSES:
INVENTOR
Alfred Rawlinson
BY Richards & Co
ATTORNEYS

UNITED STATES PATENT OFFICE.

ALFRED RAWLINSON, OF RUGBY, ENGLAND.

MOTOR-CAR DRIVING-GEAR AND GEAR-CHANGING DEVICE.

SPECIFICATION forming part of Letters Patent No. 656,215, dated August 21, 1900.

Application filed January 9, 1900. Serial No. 862. (No model.)

*To all whom it may concern:*

Be it known that I, ALFRED RAWLINSON, a subject of the Queen of Great Britain and Ireland, residing at Winwick Warren, Rugby, in the county of Warwick, England, have invented certain new and useful Improvements in Motor-Car Driving-Gears and Gear-Changing Devices, (for which I have filed an application for Letters Patent in Great Britain, No. 12,681, dated June 17, 1899,) of which the following is a specification.

My invention relates to driving-gears and gear-changing appliances for motor-cars, and has for its object to enable any gear selected to be put into action as desired and yet to insure that no two gears can possibly remain in or be put into action at the same time.

My invention consists in operating the clutches connecting the several gears of a motor-car with the driving-axle by means of a gear-shaft operated by a foot or other lever. I provide a number of cranks on the gear-shaft and a corresponding number of links with suitably-shaped ends adapted to be operated by the cranks, each link being provided with means to operate one of the clutches. The cranks are so disposed in relation to the positions of the link ends that only one crank can be in a position to operate its link at one time, and the gear-shaft is adapted to be moved longitudinally by a suitable mechanism. By moving the gear-shaft to a certain position one crank will be chosen, and when the foot-lever or other gear-shaft operating-lever is moved or let go one clutch only will be put into gear. The cranks may be adapted either to operate the links positively or to permit of the movement of each of the clutches under the action of a spring.

Referring now to the accompanying drawings, Figure 1 is an elevation, and Fig. 2 is a plan, of a driving-gear for a motor-car arranged and constructed in accordance with one modification of my invention, in which there are four clutches on the motor-shaft; Figs. 3, 4, 5, and 6, drawn to an enlarged scale, show details of the mechanism and will be referred to hereinafter.

The motor is mounted on a frame $a$, which supports the motor-shaft $b$ and also a counter-shaft $c$, adapted to be operated by means of any one of the clutches on the motor-shaft. I provide on the motor-shaft two fly-wheels $d$ and $e$, and these fly-wheels I provide with recesses $f$, which are suitably constructed to engage frictionally with clutches $g$, which are fixed to sleeves $h$. These sleeves are mounted loosely on the motor-shaft $b$ and are slid along the shaft in and out of gear by links $k$, to be described hereinafter. This sliding motion I prefer to accomplish as follows:

The motor-shaft $b$ passes through bushes $l$ in the frame $a$, and a continuation $m$ of each bush is screwed and inclosed in a nut $n$, to which are attached clips $i$, which catch a flange $o$ on each sleeve $h$. Fig. 6 is a sectional elevation through the nut $n$ and the screwed part $m$ of the bush $l$. Therefore a rotation of the nuts $n$ will slide the sleeves $h$ along the shaft and put the clutches in or out of gear. The nuts $n$ have each an arm $p$, to the end of which the links $k$ are pivotally connected, and also an arm $y$, to which the spring 27 is attached. The counter-shaft $c$, also mounted on the frame $a$, is provided with three toothed wheels $r$, which gear, respectively, with three pinions $s$, fixed on three of the sleeves $h$, carrying the clutches on the motor-shaft. The counter-shaft also carries a sprocket-wheel $t$, which is driven by a sprocket-wheel $u$, fixed on the remaining sleeve on the motor-shaft. The pinions are of different sizes, so as to give three forward speeds to the counter-shaft, while the sprocket-wheel $u$ drives the counter-shaft in a backward direction. The sprocket-wheel $t$ is mounted on a sleeve $v$, which is slid along the counter-shaft by means of a screwed bush $w$ and a nut 9 in a manner precisely the same as the sleeves on the motor-shaft. This may be omitted if the chain is adapted to slide laterally on the sprocket-wheel teeth. The nut 9 has an arm $x$, and its adjacent nut $n$ on the motor-shaft has an arm $y$. $x$ and $y$ are pivotally connected to the ends of the link $z$, by which means their motions are identical.

The driving-axle 2 carries two chain-wheels 3 and 4, which are driven by chains connecting them with chain-wheels 5 and 6 on the counter-shaft $c$. The chain-wheels 3 and 4 are loose on the axle and are formed with projections 7, adapted to engage with the paws 8 of positive clutches 10. These clutches 10 are keyed to the axle with a loose feather-key, so as to allow of longitudinal, but not of rotary, movement relatively to the axle. The number of teeth on the chain-wheels 3, 4, 5, and 6 are so arranged as to give different speeds to the axle, according as the axle is driven by the wheels 3 and 5 or the wheels 4 and 6. By this means the number of speed-changes that can be given to the axle is doubled. With the arrangement described six forward and two backward speeds can be obtained.

I provide four links $k$, each having a looped end 11, Figs. 1 and 3, the greater length of the loop 12 being perpendicular, or nearly so, to the length of the link. These loops 12 inclose the crank-shaft 14. The other ends of the links $k$ are pivotally attached, as before described, to arms $p$ of the nuts $n$ of the screw-clutches $g$. Rollers 13 and 20 are provided to support and guide each link $k$. The crank-shaft 14 has four pairs of cranks 15, with crank-pins 16. When a loop 12 of a link $k$ incloses any part of the shaft 14 between the cranks, the link $k$ cannot move, although the shaft be rotated; but if the loop incloses a crank-pin 16 then if the shaft 14 be suitably rotated through about a quarter-revolution the link $k$ will move longitudinally into a position shown in Fig. 3 and put the clutch $g$ into gear by means of the arm $p$ and screwed nut $n$. All the cranks on the crank-shaft lie in the same plane, and suitable balance-weights may be provided on the other side to balance their weight. In the position when no gear is in action the cranks are arranged to lie in a vertical plane. In this position only can the crank-shaft be traveled longitudinally, as the cranks when in any other position cannot be traveled through the loops 12 in the links $k$. The crank-shaft is given a longitudinal motion—that is, a motion in its own line—by two links 18, operating a ring 19, which works between two collars 21 in the crank-shaft. These links 18 are operated by a bell-crank lever 22, pivoted at 23 and rocked by a link 24, operated by a crank 25, fixed to a hollow shaft 26, which can be rotated by hand or otherwise in any suitable manner. The end of the bell-crank lever 22 is shown enlarged at Fig. 5, which is a section through C D. The crank-shaft 14 may be in any one of five positions longitudinally. One of these is called the "neutral" position, and when in this position all the cranks are clear of the links $k$. Therefore, although the crank-shaft be rotated, none of the links can be moved and all the clutches are withdrawn. In the other four positions one of the crank-pins 16 is in a loop 12 of a link $k$, a different link being engaged for each of these four positions of the gear-shaft. The link inclosing the pin can then be moved, as before described. The neutral position may be one of the extreme positions of the crank-shaft or may be an intermediate position—say the middle position. The links $k$ can be moved to put the clutches into gear either by a suitable positive rotation being given to the crank-shaft or they may be operated by springs 27, attached to arms $y$ on the nuts $n$, the gear-shaft being simply released. The links $k$ are returned by a suitable rotation of the crank-shaft. The crank-shaft may be rotated by means of a crank 28, keyed to it and connected by a link 29 with a foot-lever 31, pivoted at 32. Thus by a single motion—such as the depression of a foot-lever, giving a quarter or less of a turn to the crank-shaft—any clutch in gear is at once withdrawn and the motor permitted to run free.

It will be seen that by this device any gear can be selected at will and no two clutches can be put in action at the same time. This is clear, as the cranks are so placed that only one link can be opposite its crank at any one time. Further, one and the same motion of the foot-lever 31 or other operating device will rotate the crank-shaft, and thereby withdraw whichever clutch may be in action.

I actuate the positive clutches 10 by a lever 33, pivoted at 34 and operating through the clutch-shifting arms 41, said lever 33 having at its end remote from the clutches the slot 35, which incloses the crank-shaft 14. The crank-shaft at this place has six teeth 36, which are so placed on the shaft that when the clutches $g$ are withdrawn by means of the links $k$ the slotted lever 33 can pass these teeth to operate the clutch 10. The teeth 36 and slot 35 are shown clearly in Fig. 4, which is a section on the line A B of Fig. 2, drawn to an enlarged scale. No other portion of the crank-shaft will permit of the operation of the lever 33, as in any other position the slot 35 will not be in line with the teeth 36, and therefore cannot be passed over them. The lever 33 is rocked by a link 37, operated by a bell-crank lever 38, oscillated by a link 39, connected to a crank fixed on a hollow shaft 40, which can be rotated by any suitable means. The effect of this device is to prevent the position of the positive clutches 10 being altered unless the friction-clutches $g$ are withdrawn.

Having now described my invention, what I claim as new, and desire to secure by Letters Patent, is—

1. In combination, a driving and a driven shaft, variable-speed gearings connecting said shafts, clutch mechanisms interposed between the gearings and one of the shafts, and a clutch-selecting device comprising a longitudinally-movable crank-shaft, links engaging said shaft and having operating connections to the clutches, and means for reciprocating said shaft and for rotating it, substantially as described.

2. In combination, a driving or motor shaft, a driven shaft, variable-speed gearing connecting said shafts, interposed clutch mechanisms, a driven axle, variable-speed gearings connecting said driven axle, clutch mechanisms for said variable-speed gearings, a lever for operating said last-named clutches, links having operating connections to the first-named clutches and a longitudinally-movable and rotatable shaft having cranks for engaging said links and means for operating said crank-shaft, substantially as described.

In witness whereof I have hereunto set my hand in presence of two witnesses.

ALFRED RAWLINSON.

Witnesses:
JOHN B. CLEMENTS,
WALTER E. ROCHE.